(12) United States Patent
Schlebach (10) Patent No.: US 7,717,610 B2
(45) Date of Patent: May 18, 2010

(54) VESSEL AND METHOD OF AGITATING A LIQUID

(76) Inventor: Creighton Reiner Schlebach, 3 Bali Close, Capri, Cape Town (ZA) 7975

( * ) Notice: Subject to any disclaimer, the term of this patent is extended or adjusted under 35 U.S.C. 154(b) by 1012 days.

(21) Appl. No.: 10/547,326

(22) PCT Filed: Mar. 15, 2004

(86) PCT No.: PCT/IB2004/000717

§ 371 (c)(1),
(2), (4) Date: Jun. 8, 2006

(87) PCT Pub. No.: WO2004/083060

PCT Pub. Date: Sep. 30, 2004

(65) Prior Publication Data

US 2006/0233041 A1   Oct. 19, 2006

(30) Foreign Application Priority Data

Mar. 20, 2003  (GB) ................................ 0306338.5

(51) Int. Cl.
*B01F 5/06* (2006.01)
(52) U.S. Cl. .................. 366/130; 366/176.1; 366/275; 417/479
(58) Field of Classification Search ............. 366/130, 366/176.1, 275; 417/479
See application file for complete search history.

(56) References Cited

U.S. PATENT DOCUMENTS

| 2,962,201 | A | | 11/1960 | Brillis et al. |
| 2,965,274 | A | | 12/1960 | Brillis et al. |
| 3,138,371 | A | | 6/1964 | Aaron et al. |
| 3,374,922 | A | | 3/1968 | Shelby |
| 3,397,867 | A | | 8/1968 | Hoff et al. |
| 3,831,905 | A | * | 8/1974 | Htoo et al. ................. 366/136 |
| 2003/0107946 | A1 | * | 6/2003 | Cosby et al. ............... 366/127 |

OTHER PUBLICATIONS

International Search Report, PCT/IB2004/000717 mailed Sep. 1, 2004.

* cited by examiner

*Primary Examiner*—David L Sorkin
(74) *Attorney, Agent, or Firm*—Nixon Peabody LLP; Jeffrey L. Costellia (57) ABSTRACT

A vessel (10) and a method for agitating a liquid (50) in a main cavity (16) of the vessel (10), are provided. The vessel (10) includes a dividing member (40), extending deformable pump cavity (20). To agitate the liquid (50), a user presses a flexing wall (26) of the pump cavity (20), in pumping cycles, to discharge liquid from the pump cavity (20) through nozzles (42,44) into the main cavity (16). The dividing member (40) has a sloping upper surface, which causes additives (38) to collect in the region of the nozzles (44), to be agitated more effectively.

16 Claims, 8 Drawing Sheets

VESSEL AND METHOD OF AGITATING A LIQUID

FIELD OF THE INVENTION

THIS INVENTION relates to the agitation of a liquid such as a beverage, to aid in dissolving additives in the liquid, to homogenise the liquid, or the like. In particular, the invention relates to a vessel such as a cup and to a method for agitating a liquid.

BACKGROUND TO THE INVENTION

Beverages, like other liquids, often need to be agitated to aid in dissolving additives in the beverages and/or to homogenise the beverages. The agitation is conventionally brought about by stirring the beverage, but stirring of beverages is often inconvenient, especially in circumstances where a consumer or user does not have both hands free, one to hold a vessel containing the beverage and the other to stir the beverage.

SUMMARY OF THE INVENTION

According to a first aspect of the invention there is provided a vessel, which includes:
 a bottom wall and a peripheral wall, defining a main cavity for holding a liquid; and
 a deformable member extending on an outside of the vessel, proximate the bottom wall, to define a deformable cavity that is in flow communication with the main cavity of the vessel through at least one nozzle, the internal volume of the deformable cavity being variable by deformation of the deformable member, wherein the vessel includes at least one dividing member extending at least in part between the deformable cavity and the main cavity, at an angle relative to the bottom wall.

At least one nozzle may extend between the main cavity and the part of the deformable cavity that is furthest from the bottom wall, i.e. from the uppermost part of the deformable cavity, thus allowing trapped air or liquid to escape from the deformable cavity.

At least one nozzle may be formed at least in part, by a recess defined in the region of the periphery of the dividing member, such as a recess extending inwardly from an edge of the dividing member, a recess defined in the wall adjacent the periphery of the dividing member, or the like.

The dividing member may extend at an angle of at least 21 degrees, relative to the bottom wall. The angle should be sufficient to allow a liquid additive to gravitate downwards along the dividing member, when the vessel is in an upright orientation.

The dividing member may form a protuberance, protruding into the main cavity, such as a protuberance with a conical shape and a flexible zone may be defined around the protuberance, spaced from its apex, along which the protuberance may be foldable to invert its apex. The flexible zone may for example be defined by a circumferential groove extending around the conical protuberance.

For the purposes of this specification, the term "invert" means to change the orientation to its direct opposite. Thus, if the protuberance is oriented with its apex extending upwardly and the apex is inverted, the apex will extend downwardly, while the part of the protuberance that has not been inverted will retain its original orientation.

The protuberance and/or the deformable member may be detachable around its periphery, from the remainder of the vessel, to allow cleaning of the vessel components.

The deformable member may be in the form of a resilient disc, spanning the base of the protuberance.

At least one nozzle may be defined in the protuberance, said nozzle being disposed at an angle relative to a radial direction, in relation to an axis of the vessel extending through the main cavity. Instead, or in addition, a nozzle may extend from the apex of the protuberance, in a generally axial direction.

The dividing member may be in the form of a generally oval profiled disc, disposed at an angle inside the peripheral wall, with the deformable cavity defined between the dividing member and the bottom wall. The dividing member may be removable from the vessel.

The deformable member may form part of the peripheral wall and may be disposed between the bottom wall and the dividing member.

The deformable member may be thicker in its centre than adjacent its periphery, to prevent a user's finger form being burnt by hot liquid within the deformable cavity.

According to another aspect of the invention there is provided a method of agitating a liquid such as a beverage in a main cavity of a vessel, said method including:
 filling a deformable cavity at least in part with some of the liquid from the main cavity; and
 pressing a part of the deformable cavity's periphery to discharge some of the liquid from within the deformable cavity into the main cavity of the vessel through at least one nozzle, thereby agitating the liquid in the main cavity,
 characterised in that heavier components of the liquid that are separated from the liquid under gravity, slide along a dividing member that extends at least in part between the deformable cavity and the main cavity at an angle relative to a bottom wall of the vessel, to collect adjacent at least one nozzle.

The liquid may be discharged from the deformable cavity, through at least one nozzle, towards the proximity of a lower edge of the dividing member.

The liquid may be discharged from the deformable cavity, through at least one nozzle, at an angle relative to a radial direction, in relation to an axis of the vessel, and/or the liquid may be discharged through at least one nozzle from an uppermost part of the deformable cavity.

The deformable member may be deformed by pressing it against a protuberance, which extends from a tray.

BRIEF DESCRIPTION OF THE DRAWINGS

The invention will now be described by way of non-limiting example, with reference to the accompanying diagrammatic drawings.

In the drawings.

DETAIL DESCRIPTION OF THE DRAWINGS

Referring to the drawings, a vessel in accordance with the invention is generally indicated by reference numeral 10. Similar parts of different embodiments of the invention are indicated by like reference numerals, with suffixes referring to the relevant embodiments.

Referring to FIGS. 1 to 4 of the drawings, a vessel in the form of a cup 10.1 in accordance with the first embodiment of the invention, includes a bottom wall 12.1 and generally cylindrical peripheral wall 14.1, which defines a main cavity 16.1 within which a liquid in the form of a beverage (not shown) can be held.

A dividing member in the form of a generally oval profiled disc 18.1, is disposed at an angle relative to the bottom wall 12.1, to define a deformable pump cavity 20.1 between the disc and the bottom wall and to form a trough between the lower edge of the disc and the adjacent part of the peripheral wall 14.1.

The pump cavity 20.1 is in flow communication with the main cavity 16.1 through two nozzles, formed by an upper recess 22.1 and a lower recess 24.1, defined in the periphery of the disc 18.1 or in the walls adjacent the disc (not shown). The pump cavity 20.1 can be deformed by pressing a deformable member in the form of a resilient flexible wall 26.1 on the outside of the cup, in the direction of the arrow indicated by reference numeral 28.1.

The peripheral wall 14.1 and bottom wall 12.1 have a double layer construction, defining a peripheral cavity 30.1 between them, which serves as heat insulation, to inhibit heat transfer to and from a beverage when kept in the main cavity 16.1. The double layer construction includes a resilient inner liner 32.1, of which the flexing wall 26.1 forms an integral part, and which includes catches 34.1, which grip lateral edges of the disc 18.1, to hold it in position within the cup 10, in a clipping fashion. The liner 32 is slightly thicker in the centre of the flexing wall 26.1, to prevent a user's finger from being burnt by a hot beverage within the pumping cavity 20.1, when pressing the flexing wall.

The disc 18.1 includes a tab 36.1, which allows it to be gripped and to be removed from the cup 10.1, in clipping fashion, if the cup is to be washed.

In use, the main cavity 16.1 is filled with a liquid such as a beverage, e.g. tea or coffee, which also flows into the pumping cavity 20.1 via the nozzles formed by the recesses 22, 24. The position of the upper recess 22.1 at the uppermost part of the pump cavity 20.1, i.e. furthest from the bottom wall, allows air to escape from within the pump cavity, as it is being displaced by the beverage in the pump cavity, thus reducing the chances of an air-block forming within the pump cavity. In addition, the upper recess 22.1 allows beverage, caught within the pump cavity 20.1, to escape from the pump cavity as the cup 10.1 is inverted to consume the beverage.

An additive 38.1 such as sugar, is added to the beverage and forms a heavier component of the beverage that gravitates downwardly in the main cavity 16.1 and along the top of the disc 18.1, to collect in the trough adjacent the lower edge of the disc and adjacent the lower recess. If a user wants to agitate the beverage, to aid in dissolving the additive 38. 1, he presses the flexing wall 26.1 in the direction 28.1, to deform the pump cavity 20.1 so that beverage liquid is discharged from the pump cavity, through the recesses 22, 24. The liquid discharge through the lower recess 24.1 is discharged in the trough at the lower edge of the disc 18.1, where the additive 38.1 has collected and thus serves to agitate the beverage in the main cavity 16.1 and cause the additive to be suspended in the beverage. The beverage liquid discharged from the pump cavity 20.1 through the upper recess 22 flows generally upwardly in the main cavity 16.1, to agitate the beverage in the upper part of the main cavity.

The user can press the flexing wall 26.1 repeatedly, in a number of pumping cycles, to agitate the beverage.

The angle between the disc 18.1 and bottom wall 12.1 is about 45 degrees. This angle can be as low as 21 degrees or perhaps even lower, provided that it is high enough to allow the additive 38.1 to move under gravity to the trough formed between the lower part of the disc 18.1 and the peripheral wall 14.1.

Referring to FIGS. 5 to 8 of the drawings, a vessel in the form of a cup 10.2 in accordance with a second embodiment of the invention, includes a peripheral wall 14.2 and a bottom wall 12.2, incorporating a deformable member in the form of a flexing wall 26.2.

The cup 10.2 includes a dividing member in the form of a protuberance 40.2 with a generally conical shape, that is attachable to the bottom wall 12.2, to protrude into a main cavity 16.2, defined within the peripheral wall 14.2. The flexing wall 26.2 thus forms a resilient disc, spanning the base of the protuberance 40.

A deformable pump cavity 20.2 is defined between the flexing wall 26.2 and the protuberance 40.2 and is in flow communication with the main cavity 16.2, via an upper nozzle 42.2 extending from the part of the pump cavity that is furthest from the bottom wall, and peripheral nozzles 44.2, defined at the circumference of the protuberance.

The flexing wall 26.2 is thicker-in its centre, to prevent a user's finger from being burnt by a hot beverage within the pumping cavity, when pressing the flexing wall.

The circumference of the protuberance 40.2 is releasably attachable to the bottom wall 12.2, by way of complemental circumferential ridges and recesses defined on the protuberance and bottom wall, respectively, to form a clipping circumferential seal 46.2. The extent of overlap between the ridges and recesses, together with the resilience of the materials of their manufacture, is designed so that the circumferential seal 46.2 retains its structural integrity when a hot beverage is introduced into the main cavity 16.2, taking thermal expansion of the components into account.

In use, a liquid in the form of a beverage 50.2, e.g. tea or coffee is placed in the main cavity 16.2, and the beverage flows into the pump cavity 20.2 via the nozzles 42,44, while air escapes from the pump cavity via the upper nozzle 42.2. An additive 38.2 that needs to be dissolved in the beverage

Figure 7:
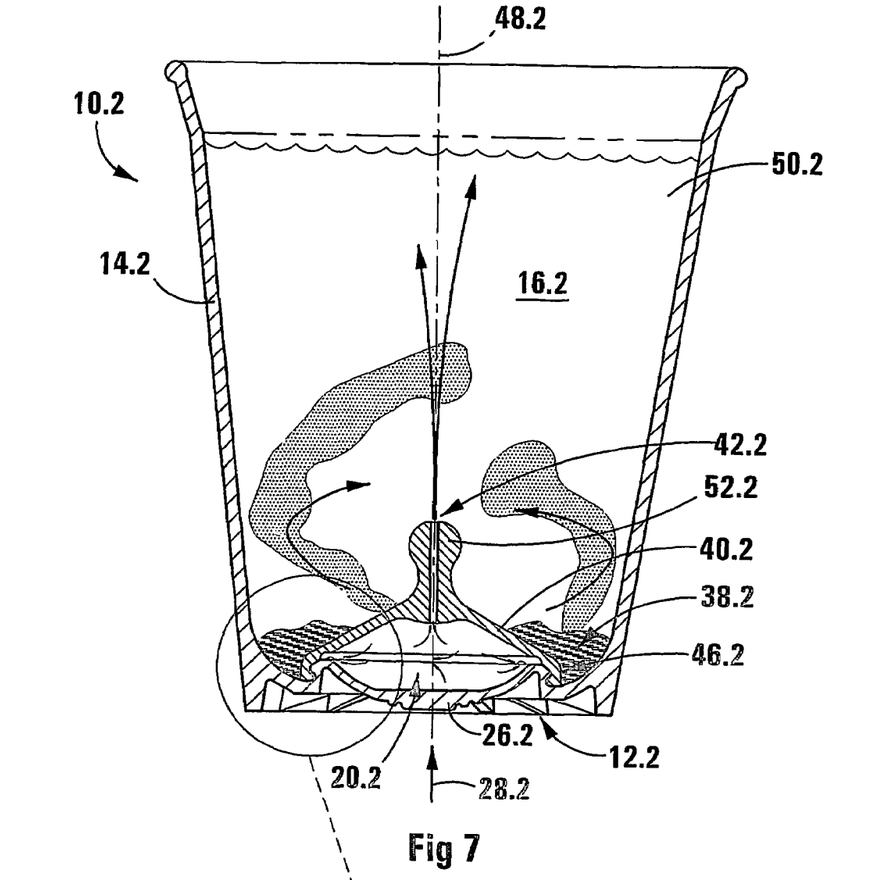
FIG. 7 shows a sectional side view of the vessel of FIG. 5, taken at VII-VII.
Figure 8:
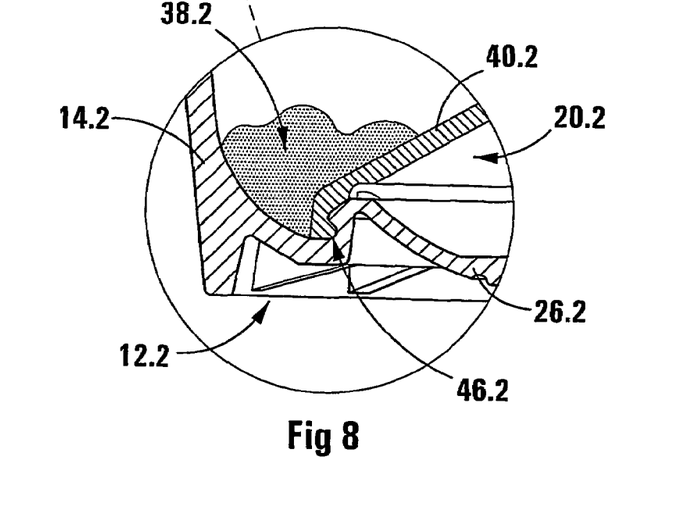
FIG. 8 shows a detailed sectional side view of part of the vessel of FIG. 5.

50.2, e.g. sugar, is added to the beverage, gravitates downwardly and slides along the upper periphery of the protuberance 40.2, to a circular trough formed between the lower edge of the periphery of the protuberance, and the bottom wall 12.2, as can be seen in FIGS. 7 and 8 of the drawings.

When a user wants to agitate the beverage 50.2 to aid in dissolving the additive 38.2, the flexing wall 26.2 is pressed with the user's finger in the direction 28.2, to deform the pump cavity 20.2 and discharge beverage liquid from the pump cavity via the nozzles 42.2, 44.2, to agitate the beverage in the main cavity 16.2.

Figure 1:
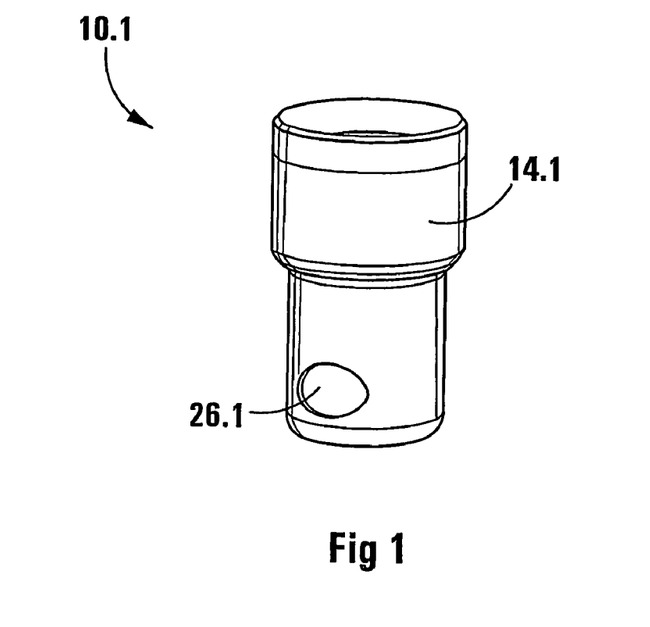
FIG. 1 shows a three-dimensional view of a vessel in accordance with a first embodiment of the invention.
Figure 2:
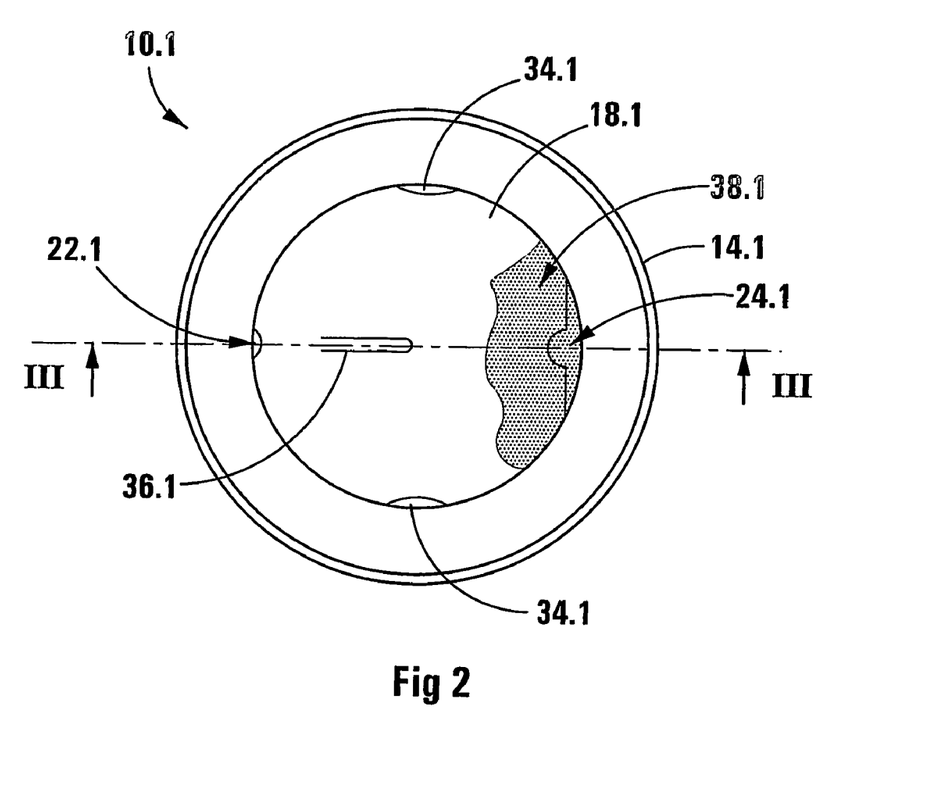
FIG. 2 shows a top plan view of the vessel of FIG. 1.
Figure 3:
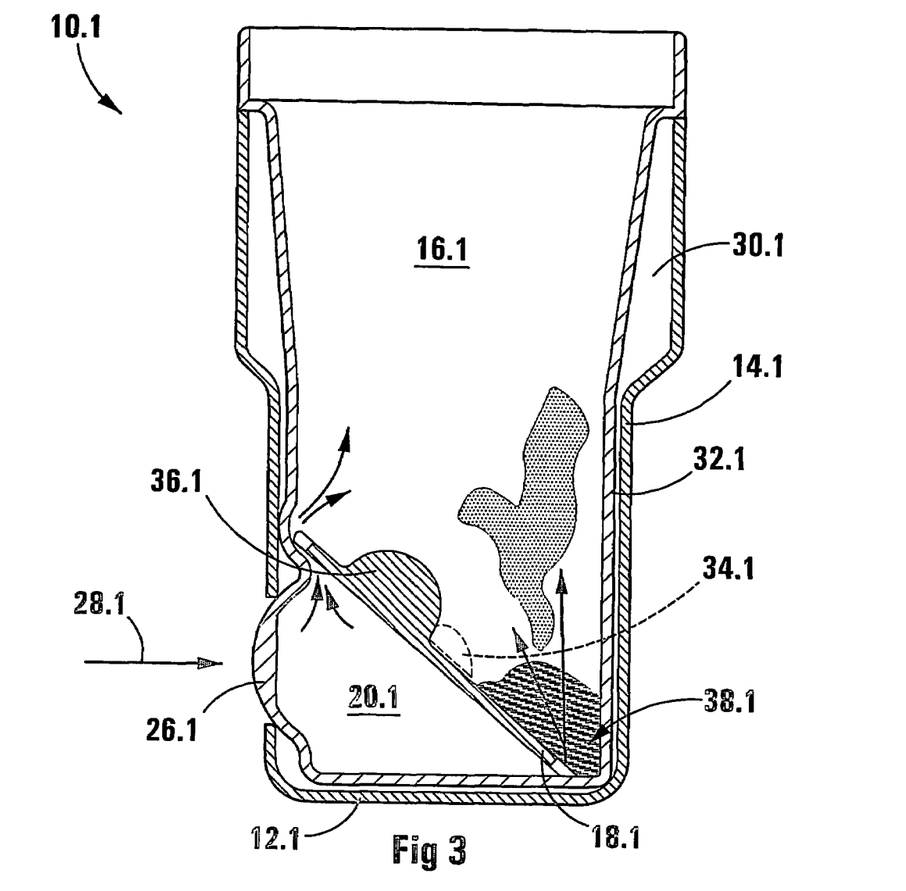
FIG. 3 shows a sectional side view of the vessel of FIG. 1, taken at III-III.
Figure 4:
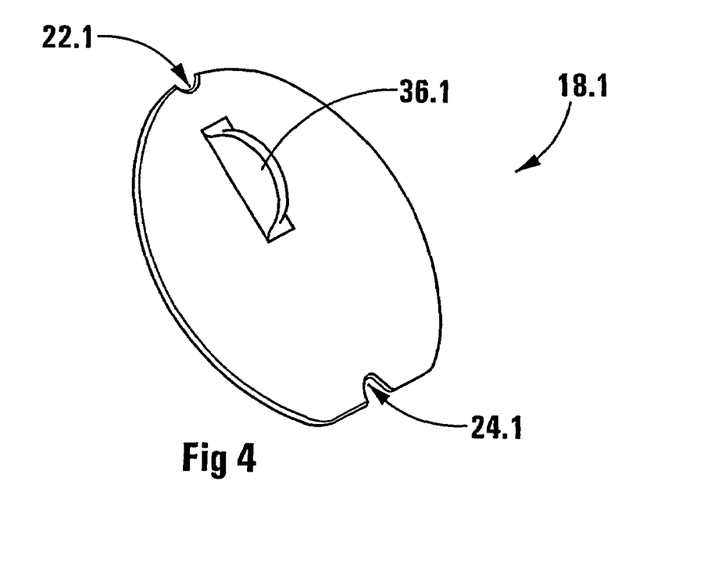
FIG. 4 shows a three-dimensional view of a dividing member of the vessel of FIG. 1.
Figure 5:
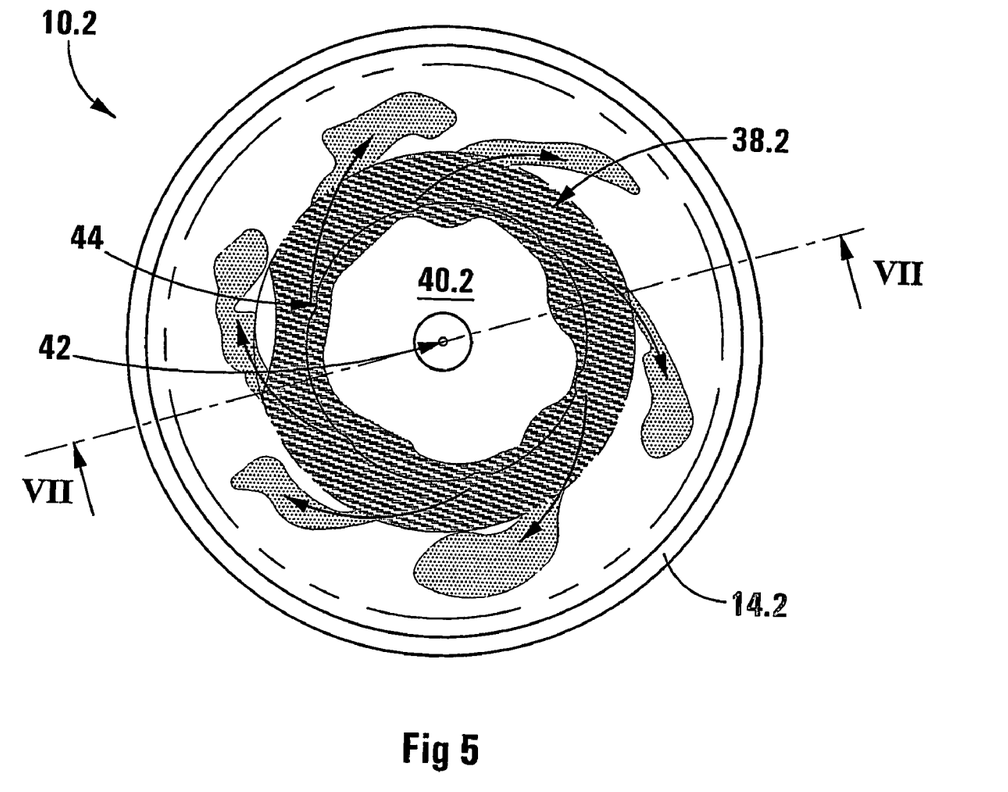
FIG. 5 shows a top plan view of a vessel in accordance with a second embodiment of the invention.

The cup 10.2 has a generally frusto-conical shape, with a central axis 48.2, extending through the main cavity 16.2, and each peripheral nozzle 44.2 is disposed at an angle relative to a radial direction, in relation to the axis. The angular orientation of the peripheral nozzles 44.2, causes beverage liquid discharged through the peripheral nozzles to cause swirling of the beverage 50.2 in the main cavity 16.2, which further assists in agitating the beverage.

Figure 6:
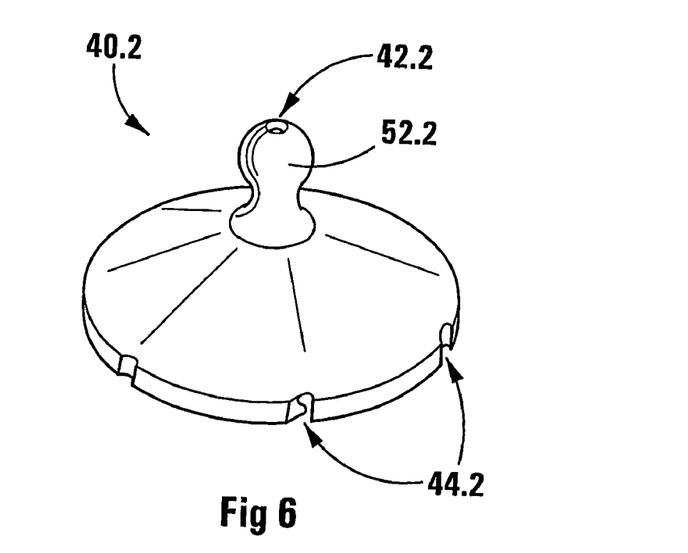
FIG. 6 shows a three-dimensional view of a dividing member of the vessel of FIG. 5.

The protuberance 40.2 includes a spigot formation 52.2, that extends from its apex, by which it can be gripped if a user wishes to remove the protuberance from the cup 10.2, e.g. if the cup and protuberance are to be washed.

Referring to FIGS. 9 to 13 of the drawings, a vessel in the form of a cup 10.3 in accordance with a third embodiment of the invention is similar to the cup 10.2 in accordance with the second embodiment of the invention shown in FIGS. 5 to 7 of the drawings, and is used in the same way, except that it has a different flexing wall 26.3 and protuberance 40.3, as described hereinbelow.

Figure 9:
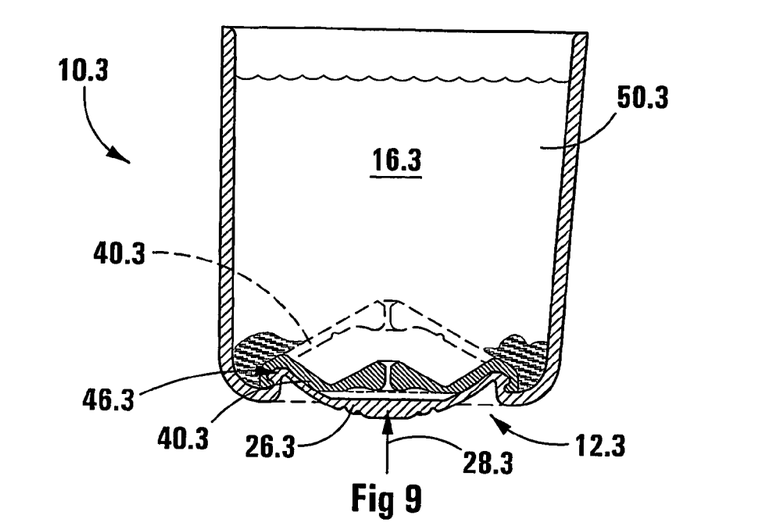
FIG. 9 shows a sectional side view of a vessel in accordance with a third embodiment of the invention.

The protuberance 40.3 has a generally conical shape and includes formations extending around its periphery, that are releasably engageable with complementary formations formed in the bottom wall 12.3, to form a releasably clipping circumferential seal 46.3.

A circumferential inner groove 54.3 is defined in an underside of the protuberance 40.3, and extends circumferentially at a position spaced between the apex and the circumference of the protuberance. The inner groove 54.3 defines a circumferentially extending flexible zone, which allows the apex of the protuberance 40.3 to be inverted relative to the part of the protuberance on the outside of the inner groove. Similarly, an outer groove 56.3 is defined in the underside of the protuberance 40.3, spaced concentrically from the inner groove 54.3. Together, the two grooves 54, 56 allow the protuberance 40.3 to be folded in a telescopic fashion, as shown in FIGS. 9 and 10 of the drawings, to reduce the extent by which the protuberance protrudes into the main cavity 16.3.

Figure 10:
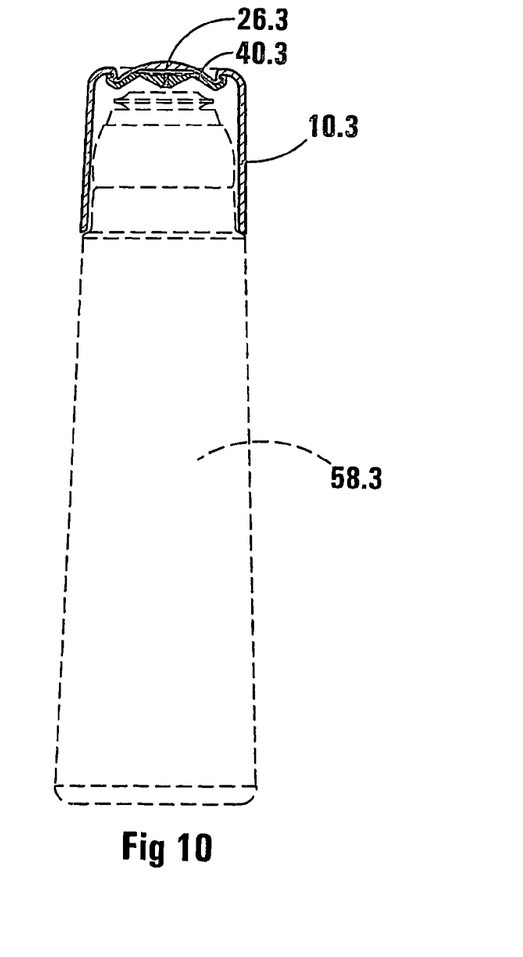
FIG. 10 shows a side elevational view of a flask on which the vessel of FIG. 9 is shown in an inverted orientation.

If it is necessary to inhibit the extent by which the protuberance 40.3 protrudes into the main cavity 16.3, e.g. when the cups 10.3 need to be nested and/or stacked, or when a cup 10.3 needs to be placed on a flask 58.3, as shown in FIG. 10 of the drawings, the protuberance can be folded telescopically, as described hereinabove. When the cup 10.3 needs to be used, the protuberance 40.3 can be unfolded from its telescopically folded condition and this can be done by pressing the flexing wall 26.3 in the direction 28.3, which urges the protuberance into the position shown in broken lines in FIG. 9 of the drawings.

Figure 11:
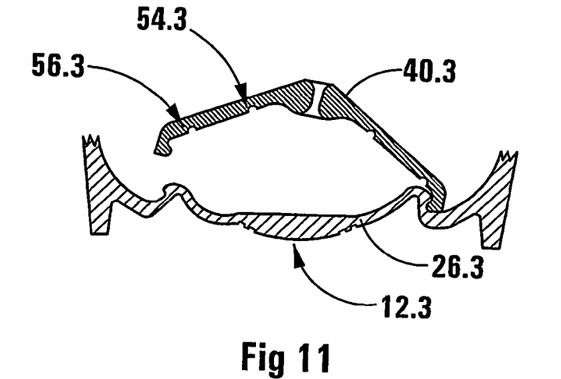
FIG. 11, FIG. 12 and FIG. 13 show three techniques for removing a dividing member from the vessel of FIG. 9.
Figure 12:
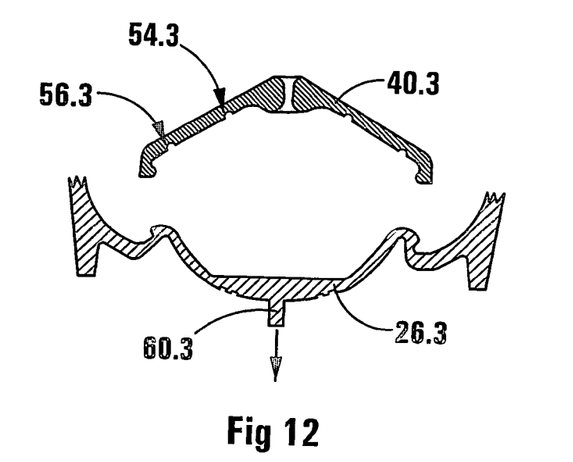
Figure 13:
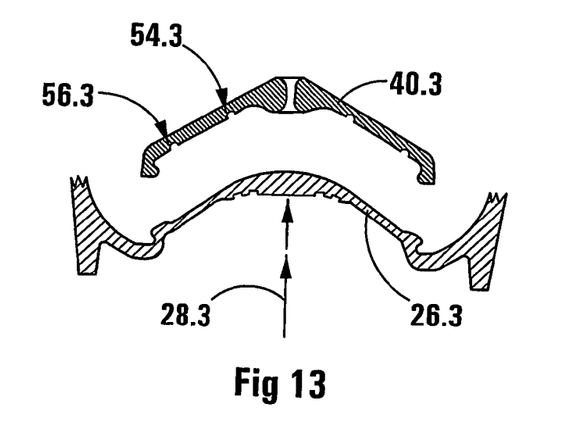

If the protuberance 40.3 needs to be removed from the bottom wall 12.3, e.g. when the cup 10.3 and protuberance 40.3 need to be washed, this can be done by manipulating and deforming the bottom wall 12.3, as shown in FIG. 11 of the drawings, thereby releasing the seal 46.3. Alternatively, a finger tab 60.3 can be provided that extends from an underside of the flexing wall 26.3, which can be pulled downwardly as shown in FIG. 12 of the drawings, thus pulling the periphery of the flexing wall inwardly, and releasing the seal 46.3. Alternatively, the flexing wall 26.3 can be pushed from below until it engages the underside of the protuberance 40.3 and can then be pushed further as shown in FIG. 13 of the drawings, until it is pushed off the bottom wall 12.3 and the seal 46.3 is released.

Referring to FIGS. 14 to 18 of the drawings, a vessel in the form of a disposable cup 10.4 in accordance with a fourth embodiment of the invention, is similar in construction to the cups 10.2 and 10.3 in accordance with the second and third embodiments of the invention, respectively, with the main differences that the cup 10.4 is made by inexpensive moulding and trimming techniques, e.g. vacuum forming, allowing it to be disposable, and that the protuberance 40.4 is fixedly attached to the bottom wall 12.4.

Figure 14:
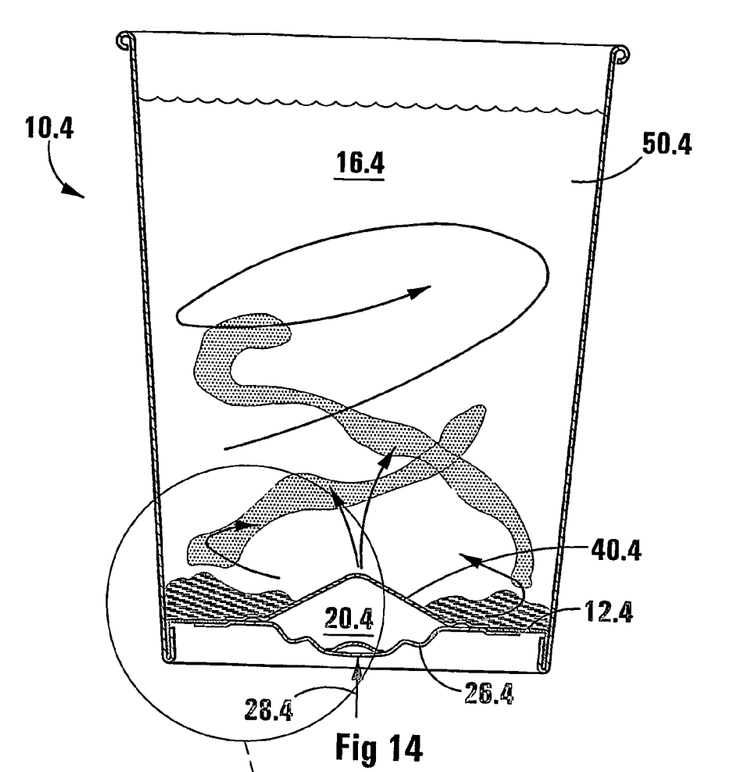
FIG. 14 shows a sectional side view of a vessel in accordance with a fourth embodiment of the invention.
Figure 15:
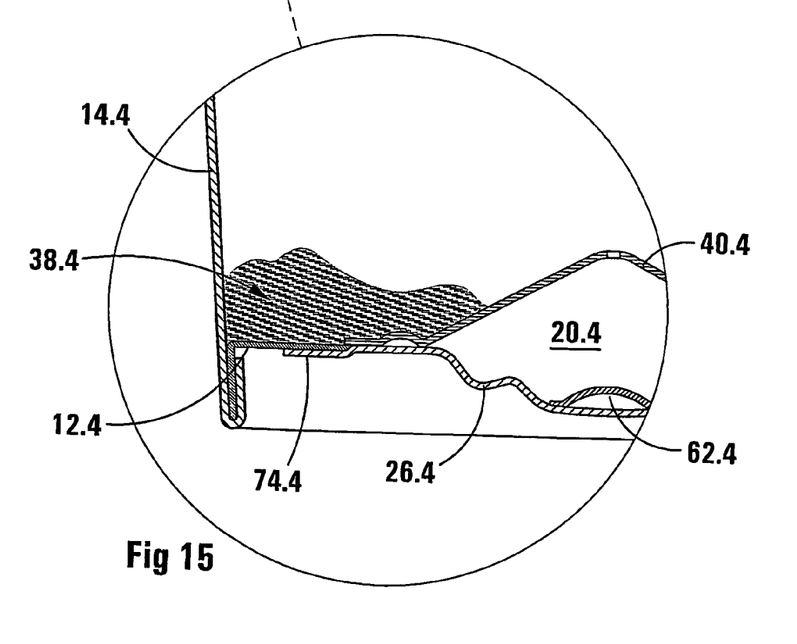
FIG. 15 shows a detailed sectional side view of part of the vessel of FIG. 14.
Figure 16:
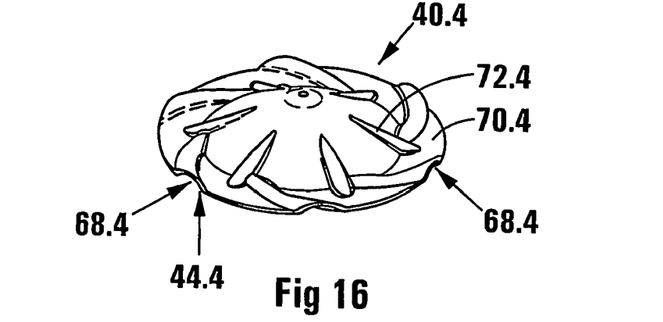
FIG. 16 shows a three-dimensional view of a dividing member of the vessel of FIG. 14.

The protuberance 40.4 defines a number of channels in its underside, each ending in a circumferential recess 68.4 at the circumference of the protuberance. Each circumferential recess 68.4 forms a peripheral nozzle 44.4, when the protuberance 40.4 is fixedly attached to the bottom wall 12.4, and is disposed at an angle relative to the radial direction. The protuberance 40.4 is made of a thin material and includes a circumferential flange 70.4 that can be attached to the bottom wall 12.4 and/or flexing wall 26.4. A number of braces 72.4 serve to strengthen the protuberance 40.4, at the inner edge of the flange 70.4.

The centre of the flexing wall 26.4 has a double-layered construction, defining a cavity 62.4 in which air is trapped, to insulate a user's finger from the heat of a hot beverage within the pump cavity 20.4, when pressing the flexing wall 26.4.

The cup 10.4 is manufactured in the same way as a conventional disposable cup, except that a circular hole is defined in its bottom wall 12.4. The flexing wall 26.4 includes a circumferential flange 74.4, that is heat-bonded or glued to the bottom wall 12.4, as shown in FIG. 15 of the drawings. Similarly, the flange 70.4 of the protuberance 40.4 is glued or heat-bonded to the bottom wall 12.4 and/or the flexing wall 26.4.

Figure 17:
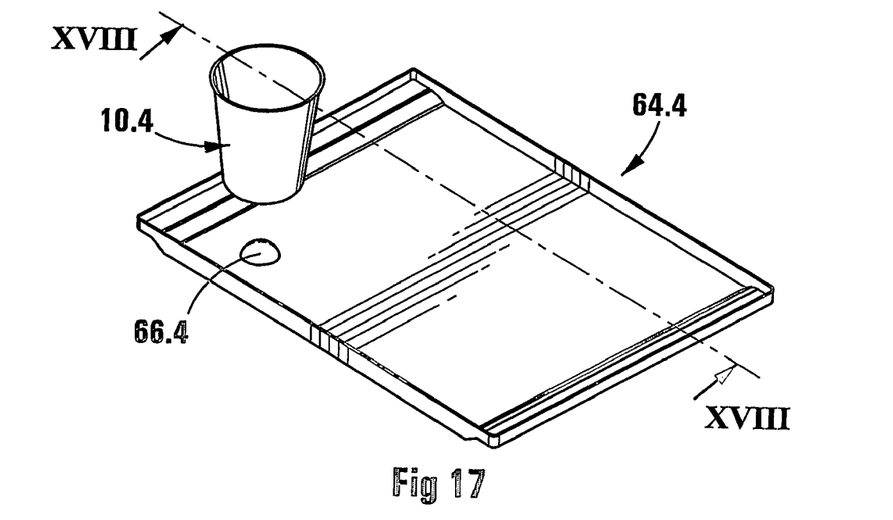
FIG. 17 shows a three-dimensional view of the vessel of FIG. 14 and a tray.
Figure 18:
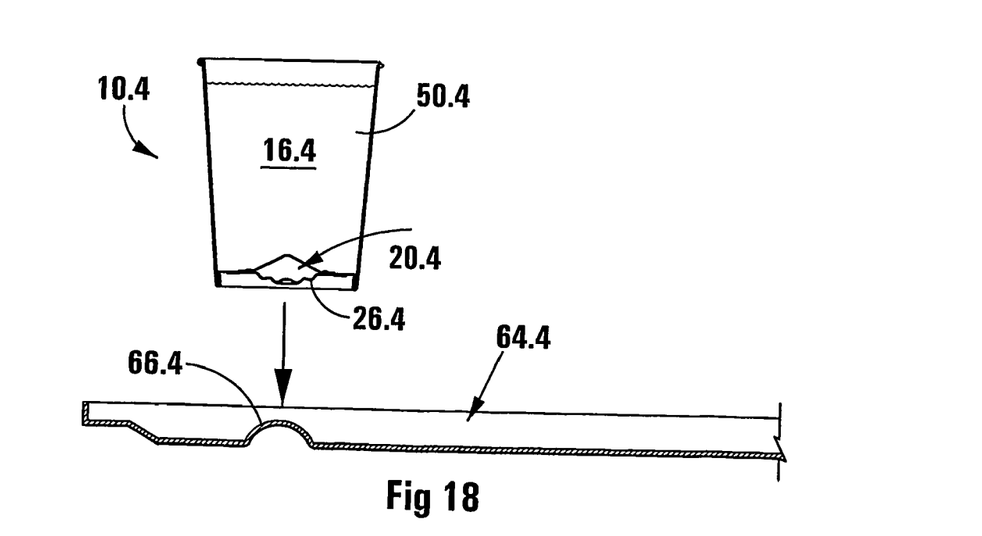
FIG. 18 shows a sectional side view of the tray and the vessel of FIG. 17, taken at XVIII-XVIII.

Referring to FIGS. 17 and 18 of the drawings, the flexing wall 26.4 of the cup 10.4 can be pressed in the direction 28.4, shown in FIG. 14 of the drawings, by pressing the cup downwardly relative to a suitable tray 64.4, so that a protuberance 66.4 extending from the tray, engages the flexing wall. The user thus need not reach for the underside of the cup 10.4, but can hold the cup in a comfortable position while moving it up and down relative to the tray, to agitate the beverage held within the cup in pump cycles as described hereinabove.

A similar protuberance 66.4 can be incorporated in a sticker, for placement in various locations, can be incorporated in a vehicle cup holder, in a table top, or the like.

The invention has been described and illustrated with reference to cups 10 for containing and agitating beverages 50, but is not intended to be limited to this application. The invention has application in a wide variety of other vessels for containing a wide variety of other liquids, e.g. paint containers, scientific vessels, etc.

The invention illustrated in FIGS. 1 to 18 of the drawings, holds the advantages that the sloping, angled upper surfaces of the disc 18 and/or protuberance 40, causes additives 38 to gravitate from the beverage 50 and collect adjacent the lower recess 24 or peripheral nozzles 44, as the case may be. The beverage liquid flowing from the pump cavity 20 through the lower recess 24/peripheral nozzles 44, is thus directed at a high concentration of the additive 38, so that the agitating effect of the flowing beverage liquid is used efficiently to assist in dissolving the additive in the beverage 50.

The invention illustrated holds further advantages as described hereinabove and in addition, in the first, second and third embodiments of the invention, the peripheral nozzles 44 and the nozzles formed by the recesses 22,24, each has a construction in which it is formed in part by a recess, and in part by the bottom wall 12 of the cup 10. When the disc 18 and/or protuberance 40 are removed from the cup 10, the recesses can be cleaned more easily than if the nozzles were simply defined as holes. The manufacture of the cup 10 is also simplified when using this construction.

The invention claimed is:

1. A vessel comprising:
    a bottom wall and a peripheral wall, defining a main cavity for holding a liquid;
    a deformable member extending on an outside of the vessel proximate the bottom wall, to define a deformable cavity that is in flow communication with the main cavity of the vessel through at least one nozzle, the internal volume of the deformable cavity being variable by deformation of the deformable member; and
    at least one sloped dividing member extending at least in part between the deformable cavity and the main cavity;
    wherein the dividing member extends at an angle relative to the bottom wall to form a trough adjacent the lower edge of the dividing member and adjacent at least one of the nozzles.

2. A vessel as claimed in claim 1, wherein at least one nozzle extends between the main cavity and the part of the deformable cavity that is furthest from the bottom wall.

3. A vessel as claimed in claim 1, wherein at least one nozzle is formed at least in part, by a recess defined in the periphery of the dividing member.

4. A vessel as claimed in claim 1 wherein the dividing member extends at an angle of at least 21 degrees, relative to the bottom wall.

5. A vessel as claimed in claim 1, wherein the dividing member forms a protuberance, protruding into the main cavity.

6. A vessel as claimed in claim 5, wherein the protuberance has a conical shape.

7. A vessel as claimed in claim 5, wherein a flexible zone is defined around the protuberance, spaced from an apex of the protuberance along which the protuberance is foldable to invert its apex.

8. A vessel as claimed in claim 5, wherein the protuberance is detachable around its periphery, from the remainder of the vessel.

9. A vessel as claimed in claim 5, wherein the deformable member is in the form of a resilient disc, spanning the base of the protuberance.

10. A vessel as claimed in claim 5, wherein at least one nozzle is defined in the protuberance, said nozzle being disposed at an angle relative to a radial direction, in relation to an axis of the vessel extending through the main cavity.

11. A vessel as claimed in claims 7, wherein a nozzle is defined, extending from the apex of the protuberance, in a generally axial direction.

12. A vessel as claimed in claim 1 wherein the dividing member is in the form of a disc disposed at an angle inside the peripheral wall, with the deformable cavity defined between the dividing member and the bottom wall.

13. A vessel as claimed in claim 12, wherein the deformable member forms part of the peripheral wall, and is disposed between the bottom wall and the dividing member.

14. A vessel as claimed in claim 13, wherein the dividing member is removable from the vessel.

15. A vessel as claimed in claim 1, wherein the deformable member is detachable around its periphery, from the remainder of the vessel.

16. A vessel as claimed in claim 1, wherein the deformable member is thicker in its centre than adjacent its periphery.

* * * * *